(12) United States Patent
Eikaas et al.

(10) Patent No.: US 9,903,169 B2
(45) Date of Patent: Feb. 27, 2018

(54) POLYMER GELS AS FLOW IMPROVERS IN WATER INJECTION SYSTEMS

(75) Inventors: Torbjørn Tenold Eikaas, Indre Arna (NO); Jan Erik Solbakken, Fyllingsdalen (NO); Egil Sunde, Sandnes (NO)

(73) Assignees: SCHLUMBERGER NORGE AS, Tananger (NO); Statoil ASA, Stavanger (NO)

( * ) Notice: Subject to any disclaimer, the term of this patent is extended or adjusted under 35 U.S.C. 154(b) by 1039 days.

(21) Appl. No.: 13/119,345

(22) PCT Filed: Sep. 17, 2009

(86) PCT No.: PCT/EP2009/062038
§ 371 (c)(1),
(2), (4) Date: May 26, 2011

(87) PCT Pub. No.: WO2010/031804
PCT Pub. Date: Mar. 25, 2010

(65) Prior Publication Data
US 2011/0220354 A1 Sep. 15, 2011

Related U.S. Application Data

(60) Provisional application No. 61/097,687, filed on Sep. 17, 2008.

(51) Int. Cl.
*E21B 21/06* (2006.01)
*C09K 8/588* (2006.01)
(Continued)

(52) U.S. Cl.
CPC ............ *E21B 21/06* (2013.01); *B01F 3/1271* (2013.01); *C02F 1/685* (2013.01); *C09K 8/588* (2013.01);
(Continued)

(58) Field of Classification Search
None
See application file for complete search history.

(56) References Cited

U.S. PATENT DOCUMENTS 3,902,558 A    9/1975  Watson, Jr.
4,204,574 A *  5/1980  Stalder ..................... 166/305.1
(Continued)

FOREIGN PATENT DOCUMENTS

CA    2737377 A1    3/2010
GB    2 176 789 A   1/1987
(Continued)

OTHER PUBLICATIONS

Office Action in corresponding Eurasian Application No. 201170453 dated May 6, 2013 (3 pages).
(Continued)

*Primary Examiner* — Anuradha Ahuja
(74) *Attorney, Agent, or Firm* — Osha Liang LLP

(57) ABSTRACT

A water injection system that includes a primary water injection line; an injection fluid supply tank; a high pressure injection pump in fluid communication with the injection fluid supply and primary water injection line for pumping injection fluid in injection fluid supply tank through the primary water injection line; a polymer gel supply tank; and a high pressure chemical injection pump in fluid communication with the polymer gel supply tank and the water injection line configured to pump polymer gel having a viscosity of at least about 50,000 cP (at 20° C. measured using a Bohlin Rheometer CSR 50, cone and plate measuring system CP 4°/40 mm, single shear rate 1/s) in the polymer gel supply tank into the water injection line for mixture with injection fluid is disclosed.

10 Claims, 2 Drawing Sheets

(51) Int. Cl.
  *E21B 43/20* (2006.01)
  *B01F 3/12* (2006.01)
  *C02F 1/68* (2006.01)
  *F17D 1/17* (2006.01)
  *C02F 1/56* (2006.01)

(52) U.S. Cl.
  CPC ............ *E21B 21/062* (2013.01); *E21B 43/20* (2013.01); *F17D 1/17* (2013.01); *C02F 1/56* (2013.01); *C02F 2209/09* (2013.01)

(56) References Cited

U.S. PATENT DOCUMENTS

| | | | | |
|---|---|---|---|---|
| 4,233,265 A | * | 11/1980 | Gasper | 422/135 |
| 4,395,340 A | * | 7/1983 | McLaughlin | 507/226 |
| 4,439,334 A | * | 3/1984 | Borchardt | 507/224 |
| 4,464,509 A | | 8/1984 | Schroeder, Jr. | |
| 4,582,628 A | * | 4/1986 | Buriks et al. | 516/185 |
| 4,605,689 A | * | 8/1986 | Witheford et al. | 523/313 |
| 4,676,315 A | | 6/1987 | Bragg | |
| 4,778,607 A | * | 10/1988 | Argabright et al. | 507/225 |
| 4,826,728 A | * | 5/1989 | O'Mara et al. | 428/407 |
| 4,828,034 A | * | 5/1989 | Constien et al. | 166/308.4 |
| 4,951,921 A | * | 8/1990 | Stahl et al. | 166/270 |
| 5,002,125 A | * | 3/1991 | Phillips et al. | 166/271 |
| 5,027,843 A | | 7/1991 | Grabois et al. | 137/13 |
| 5,052,486 A | * | 10/1991 | Wilson | 166/308.4 |
| 5,213,446 A | | 5/1993 | Dovan | |
| 5,421,411 A | * | 6/1995 | Sydansk | 166/295 |
| 5,426,137 A | | 6/1995 | Allen | |
| 5,865,247 A | * | 2/1999 | Paterson et al. | 166/252.1 |
| 2003/0196809 A1 | * | 10/2003 | Willberg et al. | 166/300 |
| 2004/0256106 A1 | * | 12/2004 | Phillippi et al. | 166/308.2 |
| 2005/0185506 A1 | * | 8/2005 | Allen | 366/164.6 |
| 2006/0107998 A1 | * | 5/2006 | Kholy et al. | 137/3 |
| 2006/0225925 A1 | | 10/2006 | Ivan et al. | |
| 2006/0276347 A1 | * | 12/2006 | Lin et al. | 507/209 |
| 2008/0041449 A1 | * | 2/2008 | Schauerte | 137/7 |
| 2009/0023614 A1 | * | 1/2009 | Sullivan et al. | 507/214 |
| 2009/0023615 A1 | * | 1/2009 | Chen et al. | 507/219 |
| 2010/0319921 A1 | | 12/2010 | Eia et al. | |

FOREIGN PATENT DOCUMENTS

| | | |
|---|---|---|
| WO | 01/83650 A2 | 11/2001 |
| WO | 2008/071808 A1 | 6/2008 |

OTHER PUBLICATIONS

International Search Report from PCT/EP2009/062038 dated Apr. 14, 2010 (3 pages).
Written Opinion from PCT/EP2009/062038 dated Apr. 14, 2010 (7 pages).
Office Action in counterpart Mexican Patent Application No. MX/a/2011/002934 dated Mar. 4, 2014 (5 pages).
Communication pursuant to Article 94(3) EPC dated Feb. 3, 2014 in corresponding EP application No. 09 736 869.0 (4 pages).
Official Action issued in corresponding Eurasian Application No. 201170453131, dated Oct. 30, 2012 (4 pages).

* cited by examiner

POLYMER GELS AS FLOW IMPROVERS IN WATER INJECTION SYSTEMS

BACKGROUND OF INVENTION

Field of the Invention

Embodiments disclosed herein relate generally to methods and systems for treating water to change the properties thereof, including rheological, flocculation, and flow properties. More specifically, embodiments disclosed herein relate generally to methods and systems for reducing drag/improving flow of water in water injection systems for hydrocarbon recovery.

Background Art

Hydrocarbons accumulated within a subterranean hydrocarbon-bearing formation are recovered or produced therefrom through production wells drilled into the subterranean formation. Initially, oil is produced from a formation by pressure depletion. In this method, the differential pressure between the formation and a production well or wells forces the oil contained within the formation toward a production well where it can be recovered. Typically, only about 10 to about 35 percent of the oil which is contained within a formation can be recovered from a formation using pressure depletion. Additionally, some formations contain oil which is too viscous to be efficiently recovered from the formation using pressure depletion methods. Because of the need to recover a larger percentage of the original oil-in-place from a formation, several methods have been developed which facilitate the recovery of oil which could not be recovered using pressure depletion techniques. These methods are sometimes hereinafter referred to as "oil recovery techniques."

When production of hydrocarbons slows, one or more injection wells may be drilled into the formation, into which fluid may be injected to maintain reservoir pressures and serve as a driving mechanism for the flow of hydrocarbons through the formation so that they may be produced from production well(s). One type of such recovery operation uses a water source, such as fresh water, brines, sea water, or produced/formation water, etc., as the injection fluid to maintain reservoir pressure and thus maintain or boost production levels.

Further, the injected water may create a vertical flood front, pushing the oil in front of the water front toward the producing well, which is referred to as water flooding. The injected water moves within the formation and mobilizes the accumulations of oil contained therein. The mobilized oil is moved within the formation toward a production well or wells where it is recovered. Water flooding may be used alone, or it may be combined with other techniques which are performed concurrently with the water flood or subsequent to it. Fluids injected later can be referred to as driving fluids. Although water is the most common, other injection and drive fluids can include gaseous fluids such as steam, carbon dioxide, and the like.

In addition, as reservoirs mature, the amount of produced water increases. To allow for environmentally friendly, and economically efficient, disposal of the produced water frequently occurs by reinjection of the produced water into the producing reservoir or injection into an abandoned reservoir.

The injection of water, however, is often limited by pumping capacity on the platform or well site, the capacity of the injection tubing or pipelines, and the reservoir. In particular, turbulent flow through the pipes presents even greater limitations on the pumping capacity and the energy expelled for injecting water into a producing reservoir (or abandoned reservoir for disposal).

Accordingly, there exists a continuing need for improvements in methods and systems for water injection into reservoirs.

SUMMARY OF INVENTION

In one aspect, embodiments disclosed herein relate to a water injection system that includes a primary water injection line; an injection fluid supply tank; a high pressure injection pump in fluid communication with the injection fluid supply and primary water injection line for pumping injection fluid in injection fluid supply tank through the primary water injection line; a polymer gel supply tank; and a high pressure chemical injection pump in fluid communication with the polymer gel supply tank and the water injection line configured to pump polymer gel having a viscosity of at least about 50,000 cP (at 20° C. measured using a Bohlin Rheometer CSR 50, cone and plate measuring system CP 4°/40 mm, single shear rate 1/s) in the polymer gel supply tank into the water injection line for mixture with injection fluid.

In another aspect, embodiments disclosed herein relate to a well injection system that includes an injection well through a subterranean formation extending to a hydrocarbon reservoir; a primary well injection line terminating in the injection well; an injection fluid supply tank; a high pressure injection pump in fluid communication with the injection fluid supply and primary well injection line for pumping injection fluid in injection fluid supply through the primary well injection line; a polymer gel supply tank; and a high pressure chemical injection pump in fluid communication with the polymer gel supply tank and the well injection line for pumping polymer gel in the polymer gel supply tank into the well injection line for mixture with injection fluid.

In another aspect, embodiments disclosed herein relate to a method of treating water that includes mixing polymer solids with water; allowing the polymer solids mixed in the water to form a polymer gel having a viscosity of at least about 50,000 cP (at 20° C. measured using a Bohlin Rheometer CSR 50, cone and plate measuring system CP 4°/40 mm, single shear rate 1/s); and pumping the polymer gel into water by application of pressure.

In yet another aspect, embodiments disclosed herein relate to a method of improving the flow of a fluid through a pipeline that includes pumping an injection fluid into the pipeline at an elevated pressure; and pumping a polymer gel into the pumped injection fluid at an elevated pressure.

In yet another aspect, embodiments disclosed herein relate to a method of producing a well that includes pumping an injection fluid at elevated pressure into a well injection line to an injection well; pumping a polymer gel into the pumped injection fluid at an elevated pressure; allowing the pumped the injection fluid and polymer gel to flow through the well injection line into a reservoir containing hydrocarbons; and producing hydrocarbons from a producing well.

Other aspects and advantages of the invention will be apparent from the following description and the appended claims.

DETAILED DESCRIPTION

Figure 1:
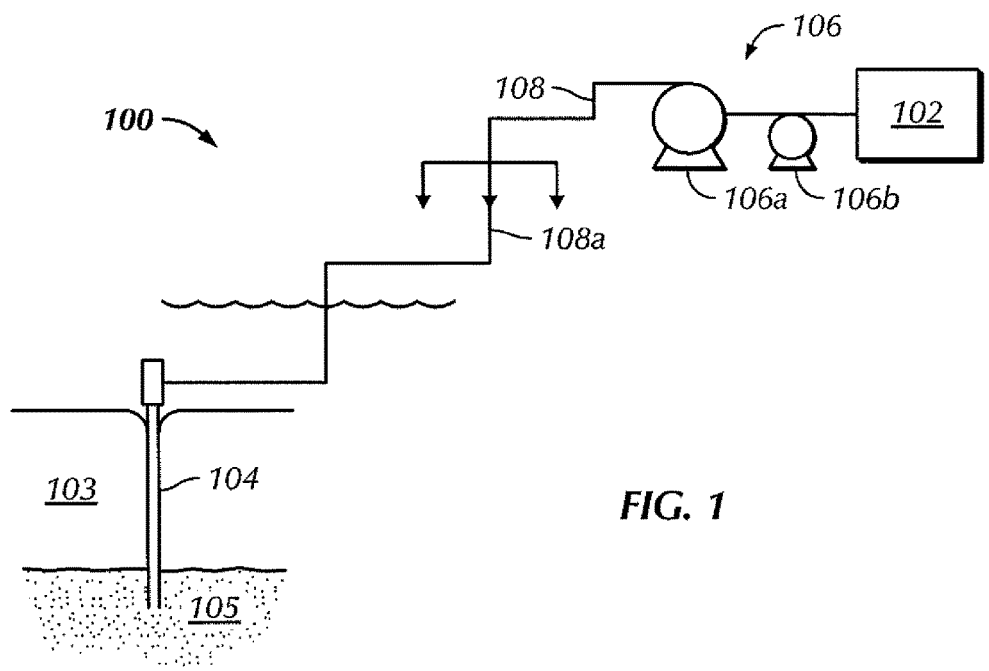
FIG. 1 shows a conventional well injection system.

In one aspect, embodiments disclosed herein relate to methods and systems for treating water to change the properties thereof, including rheological, flocculation, and flow properties. More specifically, embodiments disclosed herein relate to methods and systems for reducing drag/ improving flow of water in water injection systems for hydrocarbon recovery. In particular, embodiments disclosed herein relate to the use and injection of polymer gels into pipelines of water injection systems to reduce drag and improve the flow of water therethrough.

Drag reduction is defined as the reduction of a fluid's frictional resistance in turbulent flow and thus increase in pumpability of the fluid caused by the addition of small amounts of another substance, frequently high molecular weight polymers, to the fluid. Specifically, drag reduction is a reduction in the pressure drop over some length of a pipeline when traces of a drag reduction agent are dissolved in the pipeline fluid. Conventionally, the key factors governing the amount of drag reduction achievable in a given system are: solubility of the agent in the continuous phase; effectiveness in dispersing the agent; molecular weight of the agent; and concentration of the agent. The phenomenon of drag reduction has been used in a variety of pipelines to reduce shear stresses and thereby decrease the amount of pump power input necessary to flow fluids therethrough.

Fluid flow is characterized as being either laminar or turbulent. In laminar flow the fluid moves in layers, with one sliding smoothly over the other. There is no mixing of fluid from layer to layer, since viscous shear forces damp out relative motions between layers. Since each layer of fluid is in effect flowing over the one adjacent to it, the fluid velocity increases with the distance from the pipe wall. The resulting velocity profile is approximately parabolic in shape.

In turbulent flow, there are no discrete layers of flowing liquid. The momentum of the fluid overcomes the viscous shear forces, and there is extensive and continual mixing across the flow stream. This causes the velocity profile across a pipe to be nearly flat. In fluid dynamics, turbulent flow is characterized by rapid fluctuations of properties such as velocity, pressure and shear stress as a function of time and position in the flow. These fluctuations lead to high momentum convection and the production of unsteady vortices or eddies which lead to an increase in skin friction. This increase in drag has implications in design of piping systems where the energy required for pumping turbulent fluids increases considerably relative to laminar flow.

These two flow regimes are defined by Reynolds number (Re), the ratio of the fluid body forces to viscous forces. Values of Re of less than 2000 define the laminar flow regime for pipes. As Re increases, pipe flow transitions from laminar to turbulent over a range of values from 2,000 to 10,500 and is fully turbulent above 10,500.

Adding small quantities of high molecular weight polymers to a Newtonian fluid in turbulent flow could considerably reduce frictional drag exerted by the fluid when it flows over a surface such as a pipeline. When added to a pipeline, these polymers reduce transverse flow gradients, effectively creating a laminar flow in the pipe. This is especially true close to the pipe walls where the axial flow velocity profile has a very steep gradient in which significant pressure losses occur. Lowering these internal fluid losses increases the bulk throughput of the pipeline for a given pumping energy. This phenomenon is referred to as polymer turbulent drag reduction. The most striking application of this behavior is reduction in pumping energy requirements for pipeline flow. Drag reduction is not only important from an application point of view but also from a fundamental viewpoint. Understanding the mechanism of drag reduction will also provide insight into the phenomenon of turbulence, a very complex entity in itself.

Polymers are long chain molecules of typical dimension about 10-100 nm. When added in dilute concentrations to fluids, they reduce friction drag in pipes by as much as 20% to 80%. The origin of the drag reduction mechanism is the stretching of polymer molecules in a turbulent flow. This stretching dampens turbulent fluctuations and reduces drag. Thus, the extent of drag reduction is a function of the size of the polymer (governed by its molar mass) and the number of polymer molecules (governed by the polymer concentration). Conventionally, such polymers are supplied in either neat powder/particle form or as liquids (dispersions or emulsions). The amount or activity of polymer in the polymer blends injected is limited by the viscosity profile of the blend to that which is pumpable. That is, as the polymer content increases, there is an increased viscosity due to the swelling of the polymer chains, resulting in pumping limitations of 1 to 2 weight percent (depending on the molecular size and chain structure of the particular polymer). In addition, when using polymers in powder form, the intrinsic solubility properties of the polymer are frequently seen as limiting due to the necessity of a ripening period, wherein the polymers may swell in water, before the polymers are seen as being effective.

Thus, conventionally, such polymeric drag reducers are suspended in a solvent to allow for dispersion of the polymer in the injecting fluid needing drag reduction. In particular, polymers have been conventionally delivered as polymer dispersed in an emulsion or in a solvent package. For an emulsion, polymer is dispersed in a carrier liquid/solvent package that contains both organic solvents and some aqueous fluid to form the emulsion. For a dispersion, polymer is dispersed in a carrier liquid/solvent package that consists only of organic solvents. In both cases, surfactants/emulsifying agents are added to the carrier liquids to achieve a homogeneous stabilized liquid where the polymers do not aggregate or separate in the liquids. However, such surfactants/emulsifying agents may pose risks of reservoir souring or corrosion upon degradation of the solvents or surfactants (leading to increased microbial activity)

In accordance the present disclosure, polymeric drag reducers are delivered to the injecting fluid as a gel. As used herein, the term "gel" refers a continuous three-dimensional crosslinked polymeric network that contains a liquid medium such as water confined within the solid polymeric network. Although gels appear to be solid, jelly-like materials, by weight, gels are mostly liquid due to the volume of continuous liquid phase in which the solid particles are enveloped. The inventors of the present application have discovered that by injecting such gelled polymers into an injecting fluid (water) for a water injection system, dispersion of the drag reducing polymers may be obtained without use of organic solvents or surfactants, which may pose risks of reservoir souring or corrosion upon degradation of the solvents or surfactants (leading to increased microbial activity). To allow for pumping and dispersion of the gelled polymers, one of ordinary skill in the art would appreciate that such gels may have a hardness or stiffness in the Shore hardness A or B range. In a particular embodiment, the gelled polymer may have a viscosity of at least about 50,000 cP (at 20° C., measured using Bohlin Rheometer CSR50 cone and plate measuring system CP 4°/40 mm, single shear rate 1/s), and ranging from about 50,000 to 1,000,000 cP (at 20° C., measured using Bohlin Rheometer CSR50 cone and plate measuring system CP 4°/40 mm, single shear rate 1/s) and 100,000 to 750,000 cP (at 20° C., measured using Bohlin Rheometer CSR50 cone and plate measuring system CP 4°/40 mm, single shear rate 1/s) in various other embodiments.

Gelled polymers may be formed by allowing a drag reducing polymer such as a high molecular weight polyacrylamide to mixing a dry polymer product such as a powder with water and allowing the polymers to swell with water. The gelled polymer may then be injected into any water-based injection system for flow improvement or rheology modification purposes. Further, one skilled in the art would appreciate that the source of water to be treated or modified by the polymer gels of the present disclosure is non-limited. For example, it is specifically within the scope of the present disclosure that the term water includes fresh water, distilled water, de-ionized water, brine, seawater, formation water (synthetic or natural), field water, produced water, etc.

Referring to FIG. 1, a conventional injection well system is shown. As shown in FIG. 1, water injection well system 100 allows for the pumping or injection of injection fluid (water) 102 into injection well 104 (shown in FIG. 1 as being a subsea injection well) through a formation 103 to reservoir 105. Injection fluid 102 is pumped using a pump system 106 so that injection fluid 102 is injected into the reservoir at a sufficiently high pressure for the hydrocarbon recovery operation. Additionally, pump system 106 may optionally include a high pressure pump 106a and a booster pump 106b to allow for a step-wise pressure increase of the injection fluid 102. Injection fluid 102 may be pumped through primary injection line 108, which may optionally be split by a manifold and injection valves (not shown separately) into multiple well injection lines 108a through which injection fluid 102 may flow to and through injection well 104 to the reservoir 105. One of ordinary skill in the art would appreciate that the pressures at which injection fluid 102 should be pumped by pump system 106 may vary depending on the system requirements such as the reservoir pressure, equipment available, etc. With such high pressures and flow rates, high levels of turbulence are observed in the fluid flow, with Reynolds numbers frequently greater than 500,000, and often up to 2,500,000. Due to such highly turbulent fluid flows, there are even greater limitations on pumping injection fluid 102 through system 100.

Figure 2:
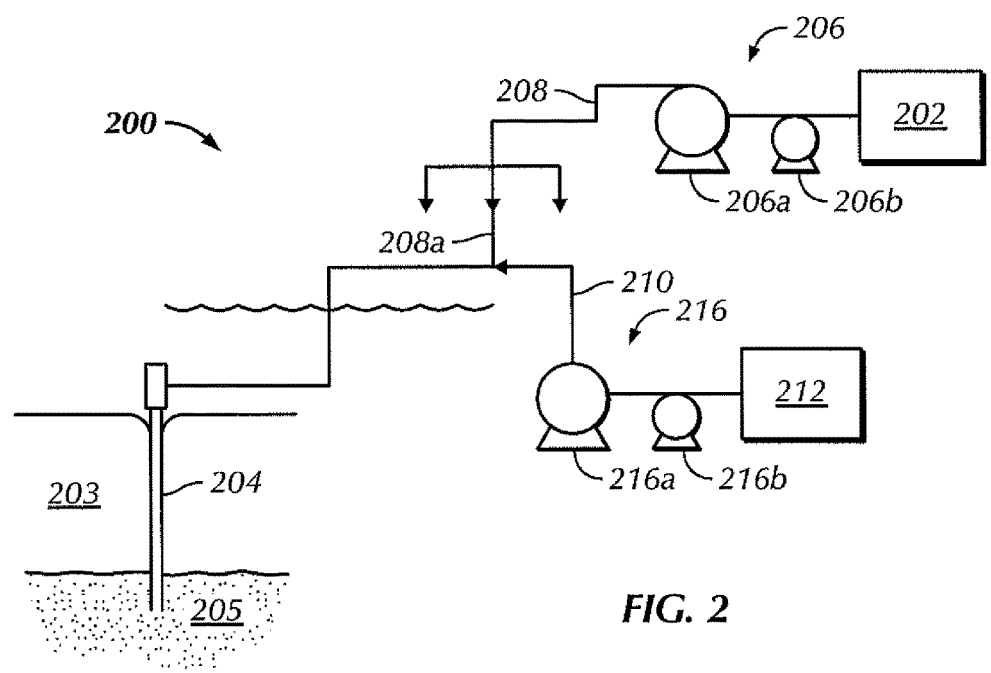
FIG. 2 shows a well injection system according to one embodiment of the present disclosure.

Referring to FIG. 2, one embodiment of an injection well system according to the present disclosure is shown. As shown in FIG. 2, injection well system 200 allows for the pumping or injection of injection fluid (water) 202 into injection well 204 (shown in FIG. 2 as being a subsea injection well) through a formation 203 to reservoir 205. Injection fluid 202 is pumped by pump system 206 having a high pressure pump 206a so that injection fluid 202 is injected into the reservoir at a sufficiently high pressure for the hydrocarbon recovery operation. Additionally, there may optionally be a booster pump 206b to allow for a step-wise pressure increase of the injection fluid 202. Injection fluid 202 may be pumped through primary injection line 208, which may optionally be split by injection valves (not shown separately) into multiple well injection lines 208a through which injection fluid 202 may flow to injection well 204. However, it is also within the scope of the present disclosure that the primary injection line 208 itself may extend into the injection well without splitting into lines for multiple injection wells. Further, as shown, into at least one well injection line 208a, a feed of polymer gel is provided through polymer gel injection line 210. Such injection of polymer gel (upon complete flow through injection well 204) may reduce the turbulence (and hence Reynolds number). Upon obtaining a reduction of turbulence, increased pumping efficiency may be realized.

Polymer gel is supplied from tank 212 to a pump system 216 for injection into well injection line(s) 208a. In a particular embodiment, polymer gel is pumped through a booster pump 216b and high pressure chemical injection pump 216a into well injection line(s) 208a, where the turbulent flow of injecting fluid mixes the injected polymer gel therein. Alternatively, polymer gel may be injected upstream of a manifold (not shown) into primary injection line 208 if treatment of all well injection lines is desired. Polymer gel may exit tank 212 either by gravity flow or by pressurization of tank 212. One of ordinary skill in the art would appreciate that the viscosity/stiffness (and activity) of the formed polymer gel may dictate its flowability and whether pressurization of tank 212 is necessary for movement of polymer gel through system 200. In a particular embodiment, pressurization of tank 212, such as to 2-4 bar, conveys polymer gel to booster pump 216b, where the pressure increases to 10-15 bar, and finally to high pressure chemical injection pump 216a, where the pressure is increased to pressures level similar to that of injection fluid 202 in well injection line(s) 208a, such as greater than 200-320 bar. Pressurization of supply tank 212 may be achieved using any means known in the art, including by feeding compressed gases into the tank or by creation of a partial vacuum at the discharge end of the tank, either of which may be aided by the use of a collapsible inner liner in the tank that may collapse and force polymer gel through a tank discharge. One example of a pressurizable tank includes a pneumatic storage vessel, such as an ISO-PUMP™, commercially available from M-I L.L.C., Houston, Tex. Use of such portable tanks may allow, for example, the formulation/mixing of polymer particles and water at a first location and transportation of the mixture to a second location for use. In particular, mixing of polymer powder and water may be performed at a mixing facility, transferred into a supply tank prior to swelling/viscosification of the polymer, and the supply tank may be then transported to the location of use, e.g., the well site, which may either be on- or off-shore.

While various pressure ranges have been described, one of ordinary skill in the art would appreciate that other pressure ranges, and/or additional pumps may be used as necessary to efficiently and effectively raise the pressure of injection fluid 202 (with polymer gel injected therein) in well injection line(s) 208a as necessary. Additionally, one of ordinary skill in the art would appreciate that pressure gauges may be included on various points of the well injection line(s) to monitor the fluid flowing therethrough, and in particular, the effectiveness of the polymer gel drag reducing agents added to the injection fluid.

Further, additional modifications to system 200 may be made as necessary. For example, depending on the activity of an initial polymer gel, it may be desirable to include additional tanks for dilution of a more concentrated polymer gel to allow for desired ripening or optimum extension of the polymer network, or such ripening may occur in injection lines, which may result in a delay in the realization of pumping efficiency.

In a particular embodiment, the activity (weight percent) of the polymer within the polymer gel may range from greater than about 3 percent to up to 50 percent. However, in other embodiments, the polymer gel may possess an activity ranging from about 5 to 20 percent. One of ordinary skill in the art would appreciate that whether the injection well is on- or off-shore may lead to more or less favorable activity ranges. For example, for an offshore injection well, where rig space is limited, an activity ranging from 7 to 15 percent may be most desirable as the polymer gel may be formed onshore and delivered to the rig in supply tanks sufficient for a day's (or other length of time) use to allow for greater space efficiency.

However, while the optimal activity ranges of the active polymer within the polymer gel may be higher than those used in conventional systems using polymer particles emulsified or solvated by a surfactant or solvent (at most 1.5% activity once diluted for injection), one of ordinary skill in the art would appreciate that the total amount of polymer injected into the well injection lines may be similar to those conventionally used. In a particular embodiment, the total amount of injected polymer may range from 5 to 2000 ppm of active polymer; however, one of ordinary skill in the art would appreciate that other amounts may be used, in accordance with drag reduction or rheology principles. For drag reduction, injection of 5 to 120 ppm of active polymer is typically sufficient, whereas in polymer flooding operations, concentrations ranging from 1000 to 2000 ppm may be used to affect the rheology and viscosity of the injection water in the reservoir. One of ordinary skill in the art would appreciate that efficiency may be asymptotic in the lower concentration ranges, and that a higher dosage rate will initially improve the efficiency but will eventually give a linear increase in efficiency versus dosage rate. Further, it is possible that too high dosage rate could result a drop in efficiency due to the increased viscosity that could influence more than the achieved reduction in the turbulent flow, but that such viscosity may be desirable if it is desired to impart a change in the rheology of the water. However, one skilled in the art would appreciate that the efficiency may also vary from system to system depending on various factors such as pipe length, amount of turbulence, pipe diameter, etc. In a particular embodiment, an injection rate of 15 to 25 ppm of the active polymer in the gel may be used for achieving reduction in turbulence in the injection systems of the present disclosure.

Examples of polymer gels suitable for use in the present disclosure include poly(ethyleneoxide), polyacrylamide and polyvinylpyrrolidone, among other natural or synthetic polymers known in the art. Typically, effective drag reducers include those polymers having relatively high molecular weights, in particular with an average molecular weight in the range of about 10,000 to about 50,000,000 in one embodiment, from about 100,000 to about 20,000,000 in another embodiment, and from about 200,000 to about 15,000,000 in yet another embodiment. Further, natural polymers including various polysaccharides polysaccharide polymers such as starch derivatives, cellulose derivatives, and biopolymers, such as: hydroxypropyl starch, hydroxyethyl starch, carboxymethyl starch, and their corresponding lightly crosslinked derivatives; carboxymethyl cellulose, hydroxyethyl cellulose, hydroxypropyl cellulose, methyl cellulose, dihydroxypropyl cellulose, and their corresponding lightly crosslinked derivatives; xanthan gum, gellan gum, welan gum and schleroglucan gum may also be used to form polymer gels for use in the injection systems of the present disclosure in various other embodiments.

While, conventionally, addition of such polymeric drag reducers to water in amounts greater than 1 to 1.5 percent results in a highly viscous gel and inadequate blending (resulting in fisheyes), the gels of the present disclosure may be formed by blending polymer particles into water quickly so that polymer particles are dispersed and water coated before substantial increase in viscosity occurs. Such blending may include mechanical agitation (such as by a magnetic stiffer) of water at high speed and pouring polymer into the "cone" formed by the rotating water. However, polymer may also be added to water flowing at a high speed, with the water flow and powder addition rate synchronized so that the desired activity of polymer is achieved. Alternatively, thorough mixing may be achieved by mixing polymer particles with water using multiple mixing devices, such as disclosed in U.S. Patent Publication No. 2010/0319921, which is assigned to the present assignee and herein incorporated by reference in its entirety.

Example

Figure 3:
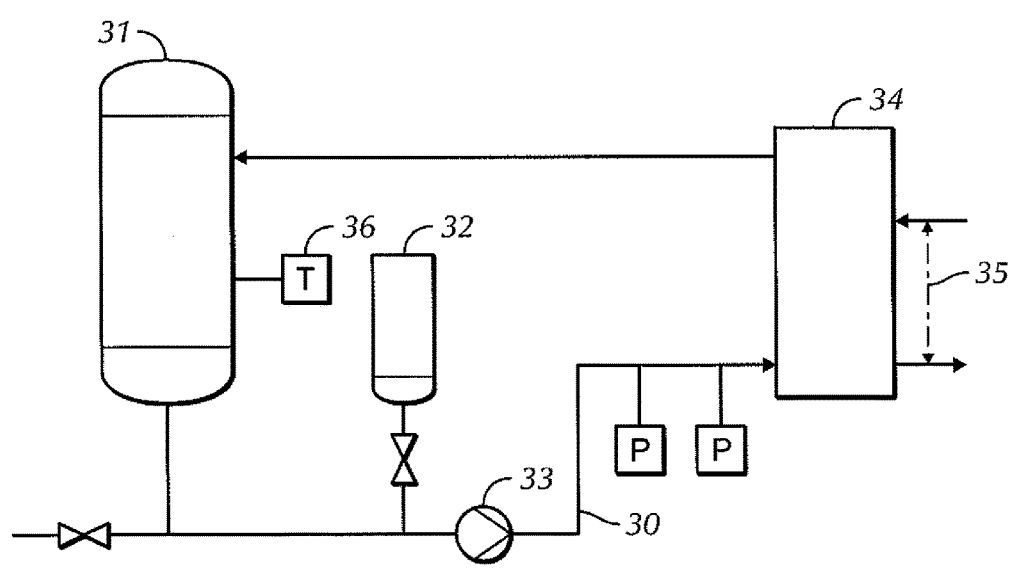
FIG. 3 shows a flow loop test equipment used in testing fluids of the present disclosure.

Tests were conducted to compare polymer gels of the present disclosure with a conventional polyacrylamide polymer dispersed in a biodegradable surfactant for flow improvement. Various activities of gels of HYPERFLOC® AF 307 HH, a polyacrylamide powder, which is commercially available from Hychem, Inc. (Tampa, Fla.) in seawater were compared to DR-201, a 40% dispersion of polyacrylamide polymer in a carrier liquid/solvent package containing biodegradable organic solvents and biodegradable surfactants commercially available from M-I SWACO NORGE AS (Stavanger, Norway) to test the efficacy of the gelled polymer as a flow improver or drag reducing agent. The tests were accomplished using a test flow loop equipment, where the velocity of seawater is approximately 5 m/s and the seawater flows with a Reynolds number of 51,000 (a turbulent flow regime). The flow loop equipment is shown in FIG. 3. As shown in FIG. 3, sea water is pumped 33 from a tank 31 (which may be a boiler to simulate downhole temperatures) though the flow line loop 30, having pressure indicator(s) for measuring the pressure of the flowing fluid. The fluid may flow through a tempered water bath 34 having a cooling water circulation 35 prior to returning to the tank 31. The pressure differential caused by the addition of a drag reducer through hopper 32. The test equipment used in this example included pipe length of 75 m and a inner diameter of 10 mm, with a total loop volume of 20 L. The results of the test are shown in Table 1.

TABLE 1

| Sample No. | Sample Type | Sample Amount added (g) | Injected polymer (ppm) | $Pf_{ini}$ (bar) | $dP_{max}$ (bar) | Efficiency $dP_{max}/Pf_{ini}$ (%) | $dP_{100}$ (bar) | Efficiency $dP_{100}/Pf_{ini}$ (%) |
|---|---|---|---|---|---|---|---|---|
| 1 | DR-201 | 1 | 20 | 11.1 | 4.28 | 38.6 | 1.3 | 11.7 |
| 2 | DR-201 | 1 | 20 | 11.2 | 4.37 | 39.0 | 1.8 | 16.1 |
| 3 | Gel - 3 wt % | 13.3 | 20 | 11.0 | 4.26 | 38.7 | 1.3 | 11.8 |

TABLE 1-continued

| Sample No. | Sample Type | Sample Amount added (g) | Injected polymer (ppm) | $Pf_{ini}$ (bar) | $dP_{max}$ (bar) | Efficiency $dP_{max}/Pf_{ini}$ (%) | $dP_{100}$ (bar) | Efficiency $dP_{100}/Pf_{ini}$ (%) |
|---|---|---|---|---|---|---|---|---|
| 4 | Gel - 5 wt % | 9 | 22.5 | 11.3 | 4.49 | 39.7 | 0.6 | 5.3 |
| 5 | Gel - 7 wt % | 5.5 | 19.3 | 11.3 | 4.48 | 39.6 | 1.7 | 15.0 |
| 6 | Gel - 9 wt % | 4.1 | 18.5 | 11.0 | 4.28 | 38.9 | 1.7 | 15.0 |
| 7 | Gel - 9 wt % | 4.4 | 19.8 | 11.7 | 4.82 | 41.2 | 1.3 | 11.1 |
| 8 | Gel - 11 wt % | 3.7 | 20.4 | 11.9 | 4.99 | 41.9 | 2.0 | 16.8 |
| 9 | Gel - 13 wt % | 3.1 | 20.2 | 11.6 | 4.77 | 41.1 | 2.2 | 19.0 |
| 10 | Gel - 40 wt % (rubber consistency) | 1 | 20 | 11.8 | 4.71 | 39.9 | 3.3 | 28.0 |
| 11 | 100 wt % powder | 0.4 | 20 | 11.5 | 4.57 | 39.7 | 3.2 | 27.8 |
| 12 | Gel - 9 wt % | 1.1 | 5 | 11.8 | 3.9 | 33.0 | 0.7 | 5.9 |
| 13 | DR-201 | 0.24 | 4.8 | 11.4 | 3.6 | 31.6 | 0.2 | 1.8 |

As shown in Table 1, the efficiencies of the gels, rubber, and powder are similar to the efficiency of the dispersion DR-201. A 20 ppm dosage rate of active polymer reduces the friction loss in the flow loop of the analyzer by approximately 40%, independent of how the polymer was pre-treated.

Further, in addition to reducing the amount of drag in a fluid, one skilled in the art would appreciate that polymeric additives may also be used to change other properties of water, including rheological properties and the ability to flocculate or separate suspensions or emulsions. Thus, it is also within the scope of the present invention that the polymeric gels of the present disclosure may be injected into water for water treatment purposes other than flow improvement. For example, other uses of the polymeric gels of the present disclosure include injection into water as a rheology modifier in a polymer flooding operation (enhanced oil recovery operations) or for water treatment purposes (flocculation) in connection with municipal plants or the paper industry.

Advantageously, embodiments of the present disclosure for at least one of the following. By incorporating flow improvers into injection systems, additional injection fluid may be injected into a reservoir at lower energy per volume water, thus giving an increased pressure support to the reservoir. This may also lead to increased production rates from neighboring producing wells. By injecting the polymer gels of the present disclosure, the flow improvement may be gained without potential risk of eventual degradation of solvents, surfactants, etc., that have been conventionally used to emulsify or disperse polymer particles within water, and which have thought to contribute to souring of a reservoir. Further, to minimize the footprint of equipment necessary to produce the polymer gels at a well site, the gels may be formed off-site and transported to the site during (or after) ripening. This may allow for the reduction in blending equipment and personnel.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A method, comprising:
    pumping an injection fluid into a pipeline; and
    improving fluid flow through the pipeline by pumping a polymer gel into the pumped injection fluid, wherein the polymer gel contains a percent by weight of polymer that ranges from about 5 to 20 percent; and
    wherein the polymer gel has a viscosity of at least about 50,000 cP.

2. The method of claim 1, wherein the pumping of the polymer gel is performed at substantially the same pressure as the pumping of the injection fluid.

3. The method of claim 1, wherein the concentration of polymer gel in the injection fluid ranges from 5 to 120 ppm.

4. The method of claim 1, wherein the polymer gel comprises at least one polymer having a molecular weight that ranges from 6,000,000 to about 20,000,000.

5. A method, comprising:
    pumping an injection fluid into a well injection line to an injection well;
    improving the fluid flow in the well injection line by pumping a polymer gel into the pumped injection fluid, wherein the polymer gel contains a percent by weight of polymer that ranges from about 5 to 20 percent; and wherein the polymer gel has a viscosity of at least about 50,000 cP;
    allowing the injection fluid and polymer gel to flow through the well injection line into a reservoir containing hydrocarbons; and
    producing hydrocarbons from a producing well.

6. The method of claim 5, wherein the pumping of the injection fluid is performed at a pressure ranging from about 200 to 320 bar.

7. The method of claim 5, wherein the pumping of the polymer gel is performed at a pressure ranging from about 200 to 320 bar.

8. The method of claim 5, wherein the pumping of the polymer gel is performed at substantially the same pressure as the pumping of the injection fluid.

9. The method of claim 5, wherein the polymer gel is pumped into the injection fluid in an amount ranging from 5 to 120 ppm of an active amount of polymer in the polymer gel.

10. The method of claim 5, wherein the polymer gel comprises at least one polymer having a molecular weight that ranges from 6,000,000 to about 20,000,000.

* * * * *